United States Patent [19]

Eaton et al.

[11] Patent Number: 5,678,191

[45] Date of Patent: Oct. 14, 1997

[54] METHOD AND APPARATUS FOR PROVIDING ACKNOWLEDGEMENTS WITHIN A COMMUNICATION SYSTEM

[75] Inventors: Eric Thomas Eaton, Lake Worth; Von Alan Mock, Boynton Beach, both of Fla.

[73] Assignee: Motorola, Inc., Schaumburg, Ill.

[21] Appl. No.: 431,872

[22] Filed: May 1, 1995

[51] Int. Cl.$^6$ .................................................. H04Q 7/00
[52] U.S. Cl. .................. 455/38.1; 455/32.1; 340/825.44
[58] Field of Search ........................ 455/32.1, 34.1, 455/38.1, 38.2, 38.3, 38.4, 54.1, 54.2, 73, 78; 370/95.1, 110.1; 340/825.3, 825.44

[56] References Cited

U.S. PATENT DOCUMENTS

| | | | |
|---|---|---|---|
| 5,371,899 | 12/1994 | Kuzmicki et al. | 455/38.1 |
| 5,379,031 | 1/1995 | Mondrosch et al. | 455/38.1 |
| 5,485,463 | 1/1996 | Godoroja | 455/38.1 |
| 5,542,115 | 7/1996 | Wong et al. | 455/53.1 |

*Primary Examiner*—Reinhard J. Eisenzopf
*Assistant Examiner*—Thanh Le
*Attorney, Agent, or Firm*—Keith A. Chanroo; Kelly A. Gardner

[57] ABSTRACT

A transceiver (125) for receiving messages and transmitting acknowledgments includes a receiver (365) for receiving a message and time information indicative of a first time slot, a display (400) coupled to the receiver (365) for presenting the message, and a monitor element (430) coupled to the display (400) for determining, at occurrence of the first time slot, whether the message has been presented. A transmitter (380) coupled to the monitor element (430) and the receiver (365) transmits, in response to occurrence of the first time slot, a message acknowledgment when the message has not been presented. When the message has been previously presented, a read acknowledgment, rather than the message acknowledgment, is transmitted to indicate both message reception and message presentation.

20 Claims, 8 Drawing Sheets

620

650

METHOD AND APPARATUS FOR PROVIDING ACKNOWLEDGEMENTS WITHIN A COMMUNICATION SYSTEM

FIELD OF THE INVENTION

This invention relates in general to communication systems, and more specifically to a method and an apparatus for providing acknowledgments within a communication system.

BACKGROUND OF THE INVENTION

Conventional communication systems often include portable transceivers that are able to provide acknowledgments of received messages. Commonly, a message transmission device, such as a paging terminal, provides a message along with a future time slot in which the message is to be acknowledged by the recipient transceiver, as shown in FIG. 1. In response to reception of the message, the transceiver generates an acknowledgment (ACK) that is transmitted back to the terminal during the time slot provided by the terminal, as shown in FIG. 2.

In some prior art communication systems, the transceiver further provides an acknowledgment, e.g., a "read acknowledgment", in response to presentation of a received message to the user. Before the read acknowledgment (REACK) can be transmitted, though, the transceiver, as depicted in FIG. 3, must request another time slot from the terminal. After the terminal provides another time slot (FIG. 4) in response to the request from the transceiver, the transceiver generates the REACK for transmission during that time slot, as shown in FIG. 5.

The transmission of both an ACK and a REACK from the transceiver to the terminal involves communication between the transceiver and the terminal on no less than five different occasions, as reflected in FIGS. 1–5. In radio communication systems, these transmissions between the transceiver and the terminal often further crowd already over-crowded systems, which can result in delays in providing messages to system subscribers.

Thus, what is needed is a method and apparatus for efficiently providing acknowledgments to a message transmission device.

SUMMARY OF THE INVENTION

According to an aspect of the present invention, a transceiver receives a message and time information indicative of a first time slot. The transceiver includes a display for presenting the message. A method for providing acknowledgments in the transceiver includes the step of generating, at occurrence of the first time slot, a message acknowledgment indicating that the message has been received when the message has not been presented. The method further includes the step of generating, at occurrence of the first time slot, a read acknowledgment to indicate that the message has been presented when the message has been previously presented. The read acknowledgment, rather than the message acknowledgment, is transmitted during the first time slot when the message has been presented on the display.

According to another aspect of the present invention, a transceiver for receiving messages and transmitting acknowledgments includes a receiver for receiving a message and time information indicative of a first time slot, a display coupled to the receiver for presenting the message, and a monitor element coupled to the display for determining, at occurrence of the first time slot, whether the message has been presented. A transmitter coupled to the monitor element and the receiver transmits, in response to occurrence of the first time slot, a message acknowledgment when the message has not been presented. When the message has been previously presented, a read acknowledgment, rather than the message acknowledgment, is transmitted. The message acknowledgment is indicative of message reception, and the read acknowledgment is indicative of both message reception and presentation when transmitted during the first time slot.

DESCRIPTION OF A PREFERRED EMBODIMENT

Figure 6:
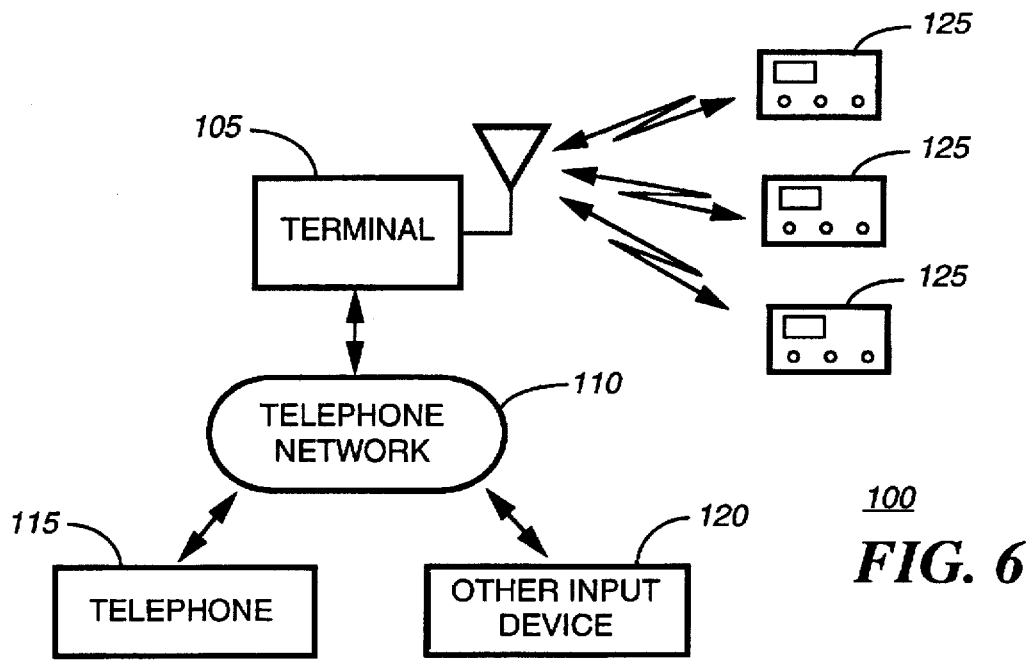
FIG. 6 is a block diagram of a communication system in accordance with the present invention.

FIG. 6 shows a communication system 100, such as a radio communication system, including a message transmission device for providing messages to transceivers 125 included in the system 100. The message transmission device can be, for example, a terminal 105 that is coupled to a telephone network 110 for receiving messages thereover. Alternatively, the terminal 105 could receive messages destined for the transceivers 125 directly from a data entry device, such as a keyboard (not shown). The messages can be provided to the terminal 105 via the telephone network 110 by a conventional telephone 115 or other input device 120, e.g., a personal computer. Along with each message, an identification of the recipient transceiver 125 is also provided to the terminal 105. The terminal then provides a message to a transceiver 125 by transmitting a radio signal including at least the address of the transceiver 125, the message, and time information indicative of a subsequent time slot. The terminal 105 preferably identifies each transmitted message by a message number also transmitted in the radio signal, although other methods of message identification could be alternatively utilized.

In response to reception of the message, the transceiver 125 transmits an acknowledgment (ACK) to the terminal 105 at the time indicated in the received time information. In other words, the transceiver 125 sends an ACK during the time slot provided by the terminal 105 in the radio signal. The ACK indicates to the terminal 105 that the transceiver 125 has received the message. According to the present invention, when the message has been presented to a user prior to occurrence of the time slot, the transceiver 125 need only transmit a read acknowledgment (REACK) to the terminal 105 during the same time slot. The REACK indicates that the user has read the message and, necessarily, that the transceiver 125 has received the message. Because only a REACK has to be transmitted when the message has been read prior to the time slot, less current in the transceiver 125 is used for transmission, resulting in increased battery life, and the communication channel is more efficiently utilized than in the situation in which both an ACK and a REACK is transmitted.

In response to reception of the REACK, the terminal 105 could, for example, notify the originator of the message that the message has been read by the transceiver user. The originator then need not personally contact the user to ensure that the message has been read.

A transceiver, such as an acknowledge-back pager, carried by a user generally alerts the user in response to reception of the message. When the alert is heard, seen, or otherwise sensed, the user often displays the message as soon as possible. Under most circumstances, the user has read the message before the occurrence of the time slot in which the transceiver is to transmit an ACK. Therefore, according to the present invention, the transceiver 125 advantageously utilizes the time slot to provide merely a REACK, thereby conserving battery life.

Figure 7:
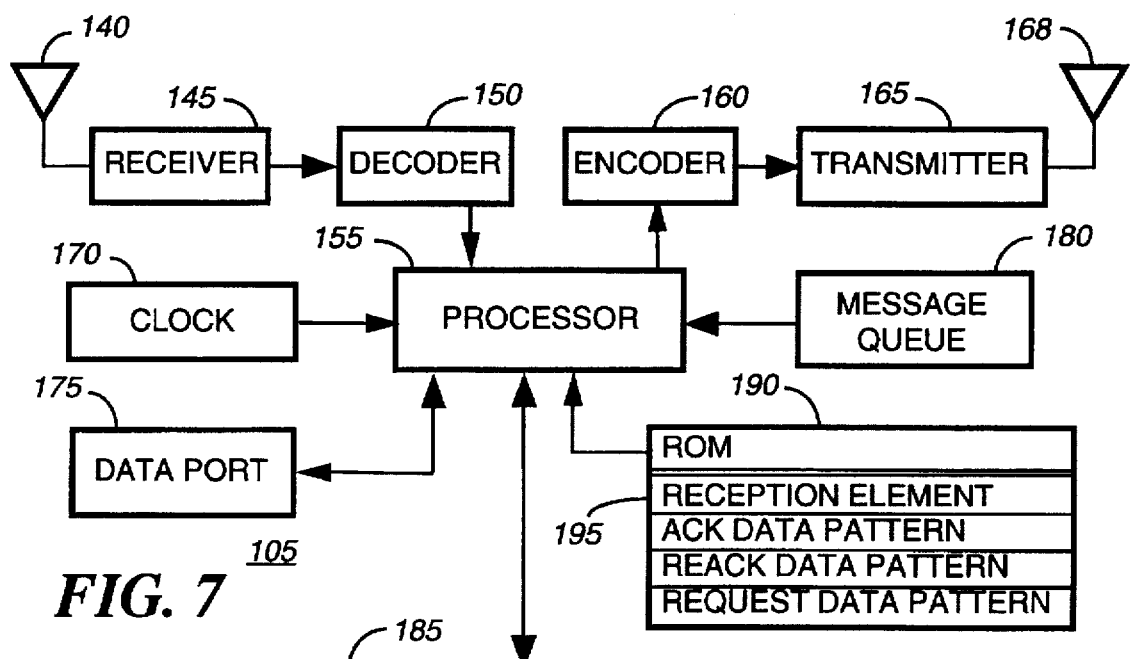
FIG. 7 is an electrical block diagram of a message transmission device included in the communication system of FIG. 6 in accordance with the present invention.

Referring next to FIG. 7, an electrical block diagram of a message transmission device, such as the terminal 105, is shown. The terminal 105 comprises an antenna 140 for receiving signals from the transceivers 125 (FIG. 6), a receiver 145 for demodulating the received signals, and a decoder 150 for decoding the information included in the signals. An encoder 160 encodes data into a signalling format, such as FLEX™ or Golay Sequential Code, for transmission by a transmitter 165 via another antenna 168. It will be appreciated that a single antenna, rather than both the antennas 140, 168, could instead be utilized as long as the single antenna is configured appropriately and as long as a switch (not shown) is employed to alternatively couple the single antenna to the receiver 145 and the transmitter 165.

A processor 155 is included in the terminal 105 for controlling the operation thereof. A data port 175 couples the processor 155 to the telephone network 110 (FIG. 6). Additionally, the terminal 105 includes a clock 170 for providing time values and a message queue 180 in which messages are stored until time for transmission.

Further coupled to the processor 155 is a memory, e.g., a transmission database 185, for storing messages and information associated with the messages. Preferably, the transmission database 185 stores, for each message, the message number assigned thereto, the address of the recipient transceiver 125, and an indication of whether an ACK has been received for the message. Any time slots provided to the recipient transceiver 125 can also be stored such that the system 100 is not over-crowded by the inadvertent assignment of a single time slot to an abundance of transceivers 125.

A reception element 195 is included in the terminal 105 for processing information in the transmission database 185. The reception element 195 can, for example, comprise a firmware element stored in another memory, such as a read only memory (ROM) 190. Preferably, the ROM 190 also stores an ACK data pattern, a REACK data pattern, and a request data pattern utilized in the recognition of signals received from the transceivers 125.

Figure 8:
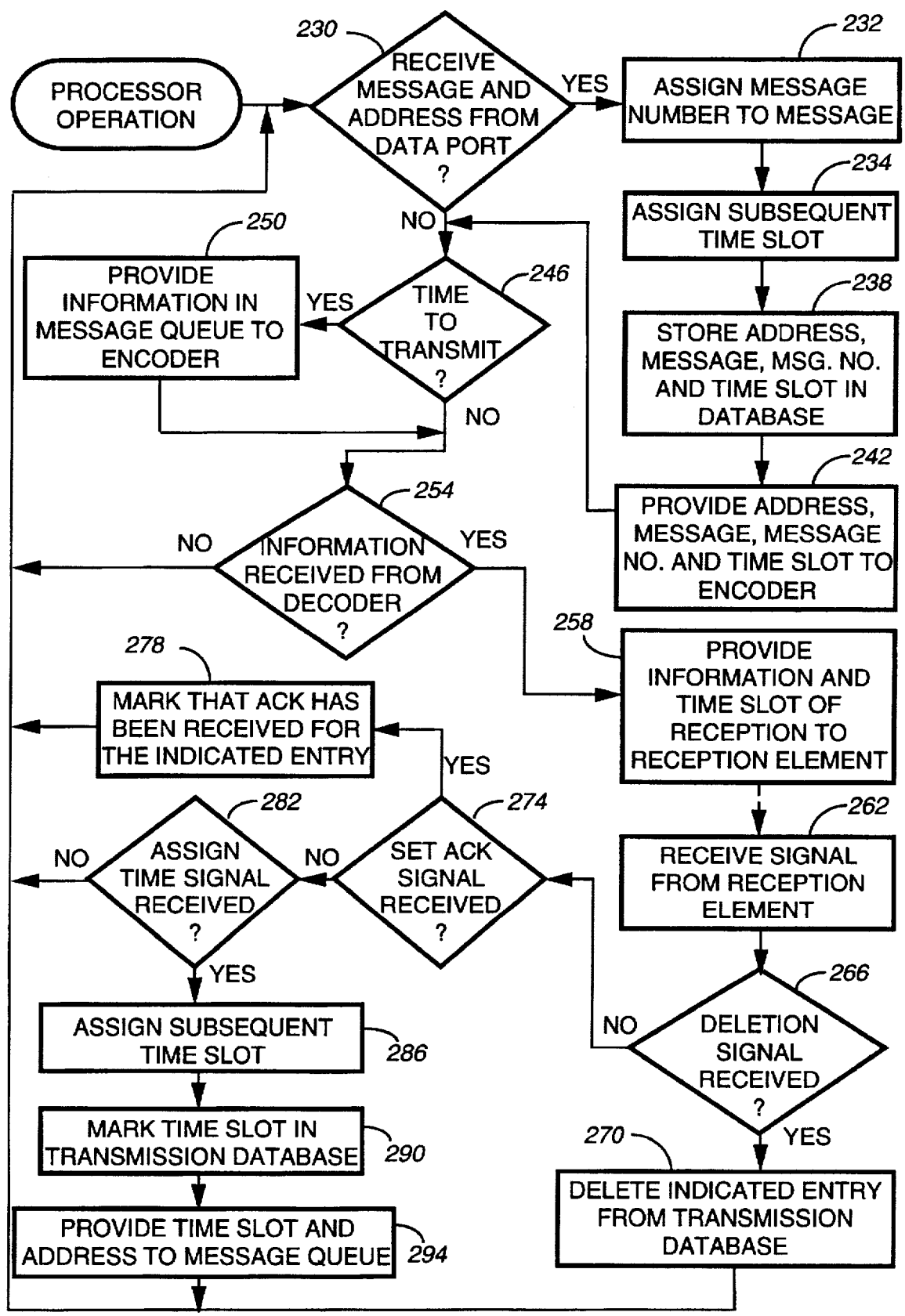
FIG. 8 is a flowchart depicting an operation of a processor included in the message transmission device of FIG. 7 in accordance with the present invention.

FIG. 8 is a flowchart showing an operation of the processor 155 according to the present invention. At step 230, the processor 155 receives a message and a transceiver address from the data port 175. The processor 155 then assigns, at step 232, an unused message number to the message so that later transmissions received from the transceiver 125 can be identified as associated with the message. Other methods of distinctly identifying a message could alternatively be used. For example, unique cyclical redundancy codes transmitted integrally with transmitted messages could be utilized.

Additionally, at step 234, a subsequent time slot, which is to be transmitted with the message, is assigned. The address, message, message number, and time slot are then stored, at step 238, in the transmission database 185 (FIG. 7) and provided, at step 242, to the message queue 180. When it is time to transmitted the queued messages, at step 246, the information stored therein is provided, at step 250, to the encoder 160 for transmission to recipient transceivers 125.

When, at step 254, the processor 155 receives information from the decoder 150, the information and time slot of reception are provided, at step 258, to the reception element 195, which subsequently responds by transmitting a signal to the processor 155, at step 262. When, at step 266, a signal recognized as a "deletion" signal is received by the processor 155, the processor 155, at step 270, deletes from the transmission database 185 an entry indicated by information included in the deletion signal. The deletion signal could, for example, include a predetermined "deletion" pattern as well as a message number. Alternatively, the predetermined deletion pattern could be accompanied simply by the transceiver address of the entry when only a single message has been transmitted to that transceiver 125.

When, at step 274, the reception element 195 provides the processor 155 with a "SET ACK" signal, which includes an identification of a database entry, the processor 155, at step 278, marks that an ACK has been received for the message indicated by the SET ACK signal. When an ASSIGN TIME signal is received, at step 282, the processor 155 determines from the ASSIGN TIME signal which entry in the database 185 is identified by the signal and then, at step 286, assigns a subsequent time slot for use by the transceiver 125 associated with the database entry. The subsequent time slot is preferably stored, at step 290, in the database 185. The time slot and transceiver address are then provided, at step 294, to the message queue 180 for transmission over the air.

Figure 9:
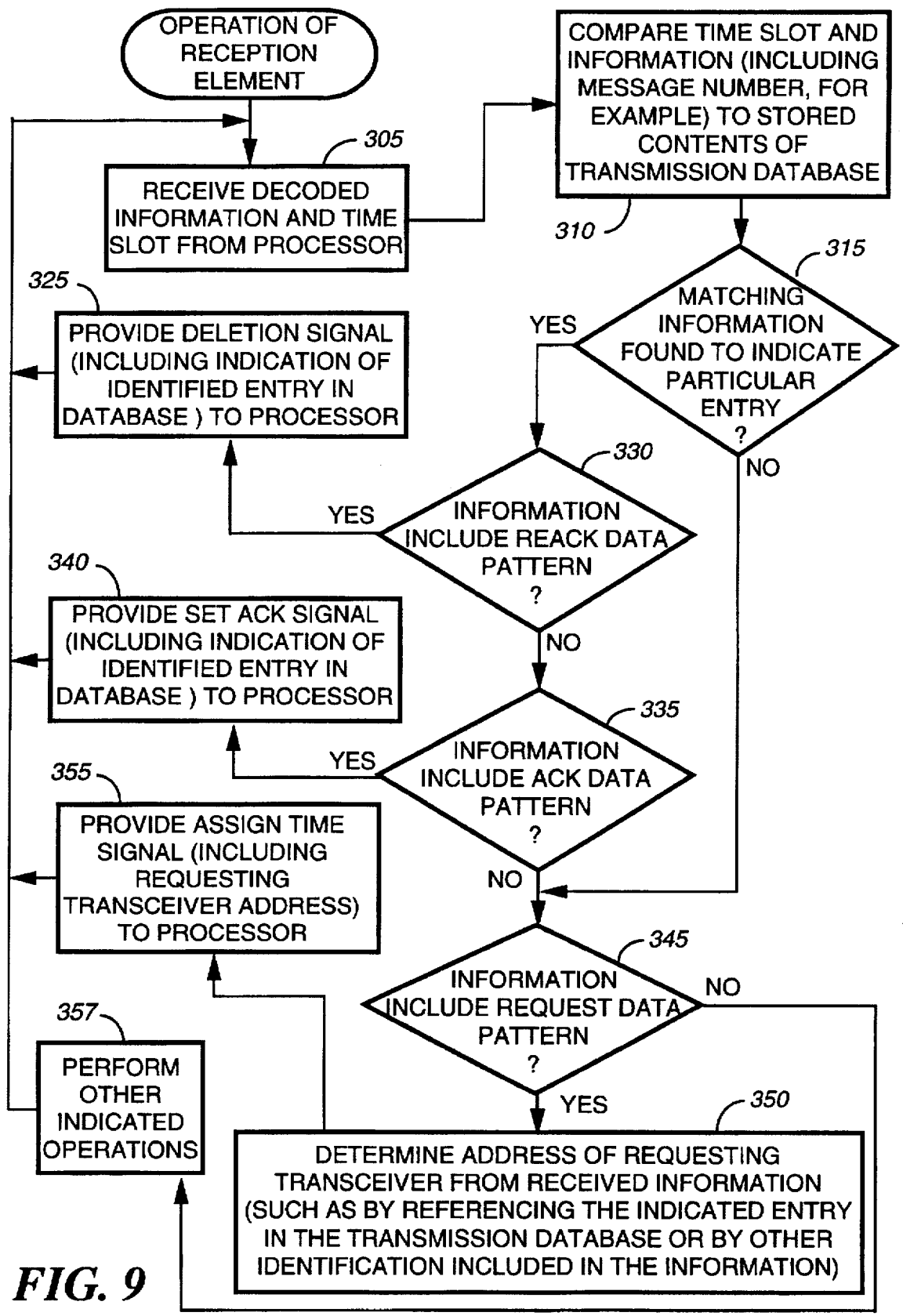
FIG. 9 is a flowchart of an operation of a reception element included in the message transmission device of FIG. 7 in accordance with the present invention.

FIG. 9 is a flowchart depicting an operation of the reception element 195 according to the present invention. At step 305, decoded information and a time slot are received from the processor 155 (FIG. 7). The reception element 195 then, at step 310, compares the time slot and received information, which can, for instance, include a message number, to stored information in the transmission database 185 for the purpose of identifying a particular message entry in the database 185. When, at step 315, matching information indicates a particular database entry, the reception element 195 determines, at step 330, whether the information received from the processor 155 includes a REACK data pattern. This can be determined, for instance, by referencing the predetermined REACK data pattern stored in the ROM 190 (FIG. 7).

When a REACK data pattern is recognized in the information, the reception element 195 generates and provides, at step 325, a deletion signal to the processor 155. According to the present invention, the deletion signal identifies, such as by message number, a particular database entry which is to be deleted by the processor 155 when both an ACK and a REACK have been received or when merely a REACK has been received, thereby indicating that the message has been received as well as presented.

When only an ACK data pattern is included in the information, at step 335, the reception element 195 provides, at step 340, a SET ACK signal to the processor 155 instructing the processor 155 to flag a particular entry in the database 185 to indicate that an ACK for that message has been received. When, at step 345, the reception element 195 recognizes a request data pattern in the information, the address of the requesting transceiver 125 is determined, at step 350, from the received information. This can be done, for example, by using the message number included in the received information to reference the transmission database 185 and recover the transceiver address therefrom. The reception element 195 then provides, at step 355, an "ASSIGN TIME" signal, which includes the transceiver address, to the processor 155. When the information does not include an ACK, REACK or request data pattern, the reception element 195 performs another indicated operation, at step 357.

According to the present invention, the terminal 105 provides a single time slot to a transceiver 125 when a message is provided thereto. When the user of the transceiver 125 has read the message prior to occurrence of the time slot, the transceiver 125 transmits a REACK, rather than an ACK, back to the terminal 105 during the provided time slot. In this manner, the communication channel is efficiently utilized because the transceiver 125 need not request another time slot for subsequent transmission of the REACK and because only a REACK, as opposed to both an ACK and a REACK, is transmitted. When the message has not been read prior to occurrence of the time slot, an ACK is transmitted during the time slot. Preferably, the transceiver 125 only requests another time slot for transmission of a REACK, though, when the user has not read the message before transmission of the ACK.

In conventional communication systems, on the other hand, a transceiver always provides only an ACK back to a terminal during a first time slot provided by the terminal regardless of whether the message has been presented already. After a user has been presented with the message, the transceiver then requests another time slot, which is transmitted to the transceiver by the terminal. Thereafter, the transceiver sends the REACK during the second time slot. This process occurs whether or not a user has read the message prior to the first time slot, resulting in wasted time, inefficient utilization of the communication channel, and decreased battery life caused by the consumption of additional current used in transmitting the time slot request and the REACK.

Figure 10:
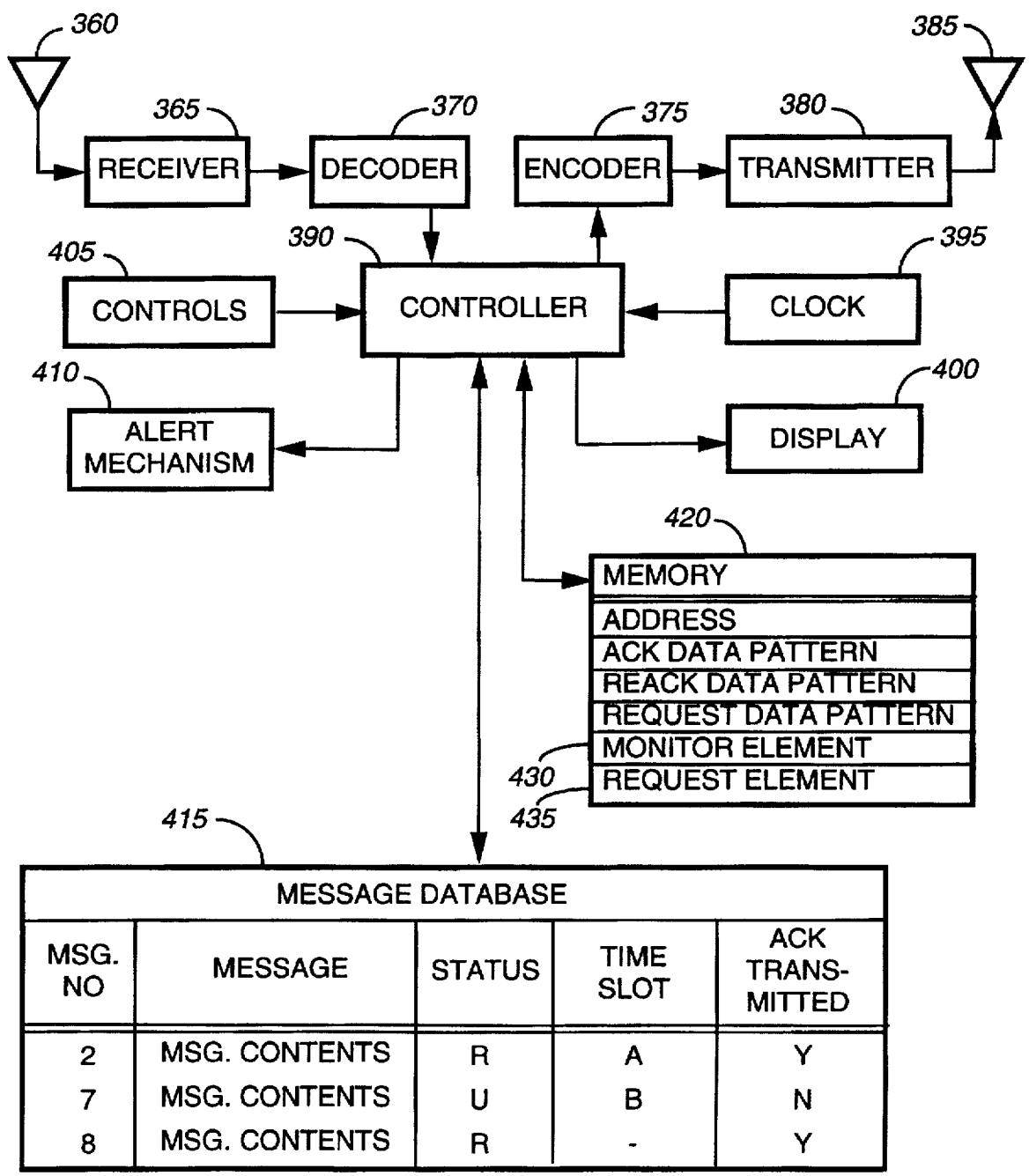
FIG. 10 is an electrical block diagram of a transceiver included in the communication system of FIG. 6 in accordance with the present invention.

FIG. 10 is an electrical block diagram of a transceiver 125, such as a portable paging device, according to the present invention. The transceiver 125 includes an antenna 360 for providing signals to a receiver 365. A decoder 370 coupled to the receiver 365 decodes the received signals. An encoder 375 included in the transceiver 125 encodes data to be transmitted into a signalling format such as FLEX™, and a transmitter 380 modulates the encoded data and provides it to a transmitting antenna 385. It will be understood that a single antenna could be alternatively utilized when coupled to the transmitter 380 and the receiver 365 by a switch (not shown).

A controller 390 controls the operation of the transceiver 125, and a clock 395 provides time values to the controller 390. Controls 405 are coupled to the controller 390 for providing user-initiated signals thereto, and an alert mechanism 410 is coupled to the controller 390 for alerting a user in response to message reception. Messages are preferably presented by a presentation device, such as a display 400 or speaker (not shown).

A memory, e.g., a message database 415, is included in the transceiver 125 for storing received messages, message numbers associated therewith, and presentation statuses, such as "read" or "unread." The message database 415 further stores a time slot for communication and an indication of whether an ACK has been transmitted for each message.

Another memory 420 coupled to the controller 390 stores a transceiver address and ACK, REACK, and request data patterns. A monitor element 430 monitors the times for transmissions from the transceiver 125, and a request element 435 processes any requests for further time slots. The monitor element 430 and the request element 435 can be, for example, firmware elements that are stored in the memory 420 and executed by the controller 390.

Figure 11:
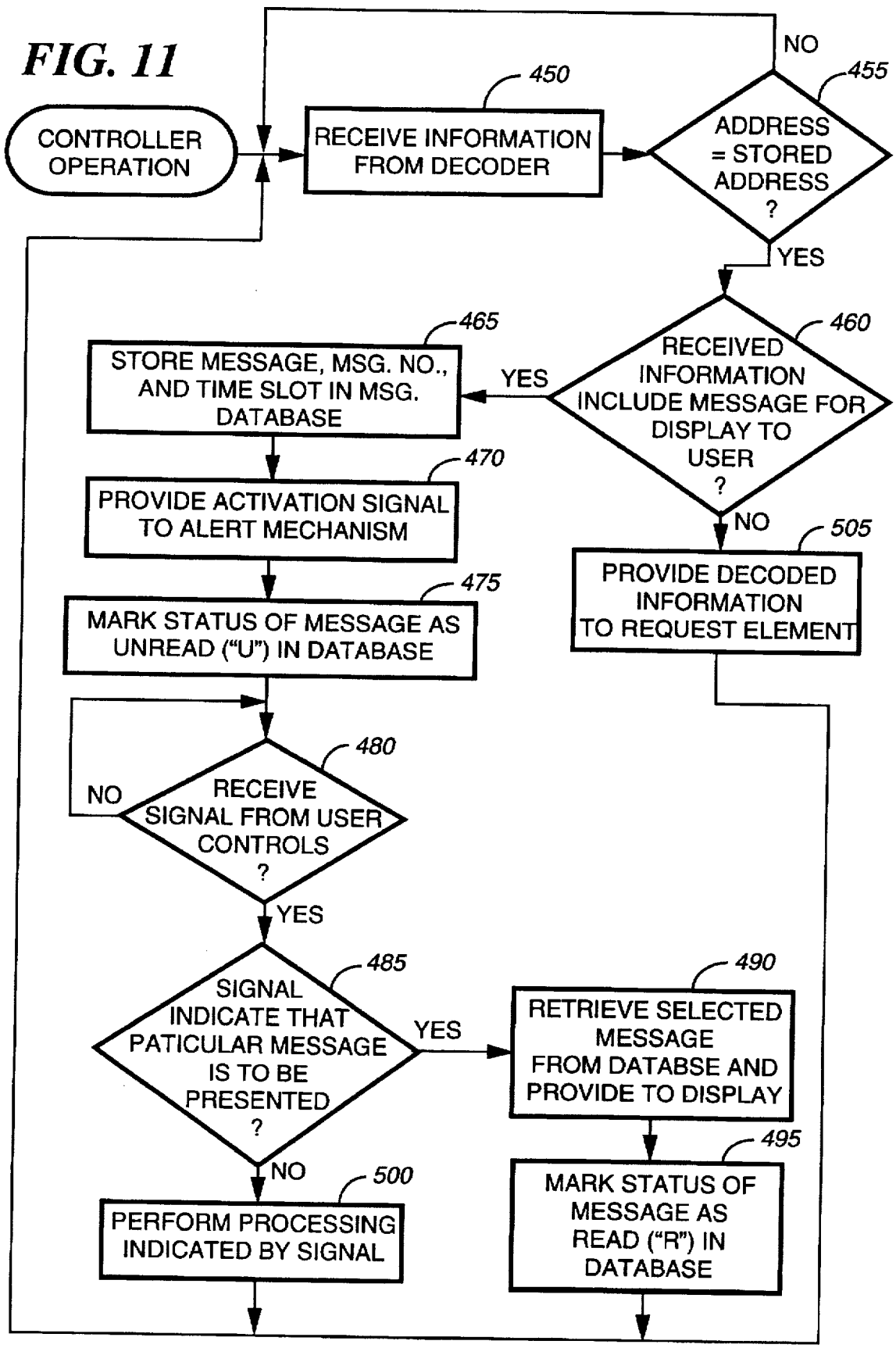
FIG. 11 is a flowchart showing an operation of a controller included in the transceiver of FIG. 10 in accordance with the present invention.

FIG. 11 is a flowchart of an operation of the controller 390 (FIG. 10). The controller 390, at step 450, receives information from the decoder 370. When, at step 455, the received address is equivalent to the address stored in the memory 420, the controller 390 determines, at step 460, whether the received information includes a message intended for presentation to the user. When the received information does not include a message to be presented to the user, the controller 390 provides, at step 505, the decoded information to the request element 435 (FIG. 10).

Preferably, a message intended for presentation to the user is accompanied by a time slot and a message number for uniquely identifying the message. When the received information includes a message, the time slot, message number, and message included in the information are stored in the message database 415, at step 465. Thereafter, the controller 390 activates, at step 470, the alert mechanism 410 to alert the user to message reception. The controller 390 also, at step 475, marks the status of the message as "unread" in the message database 415 since the message has not yet been presented to the user. It will be appreciated that an "unread" status indicates that the message has not yet been audibly presented in embodiments in which the presentation device comprises a speaker rather than the display 400.

When, at step 480, the controller 390 receives a signal from the user controls 405, and when, at step 485, the signal indicates that a particular message is to be presented, the controller 390 retrieves, at step 490, the selected message and provides it to the display 400. Thereafter, at step 495, the controller 390 marks the status of the message as "read" in the database 415. The status of the message can be marked, for example, by setting a flag in the database 415 or by setting a bit to one of two possible predetermined values.

When the signal received from the user controls is not a request for presentation, the controller 390 performs another operation indicated by the signal, at step 500.

Figure 12:
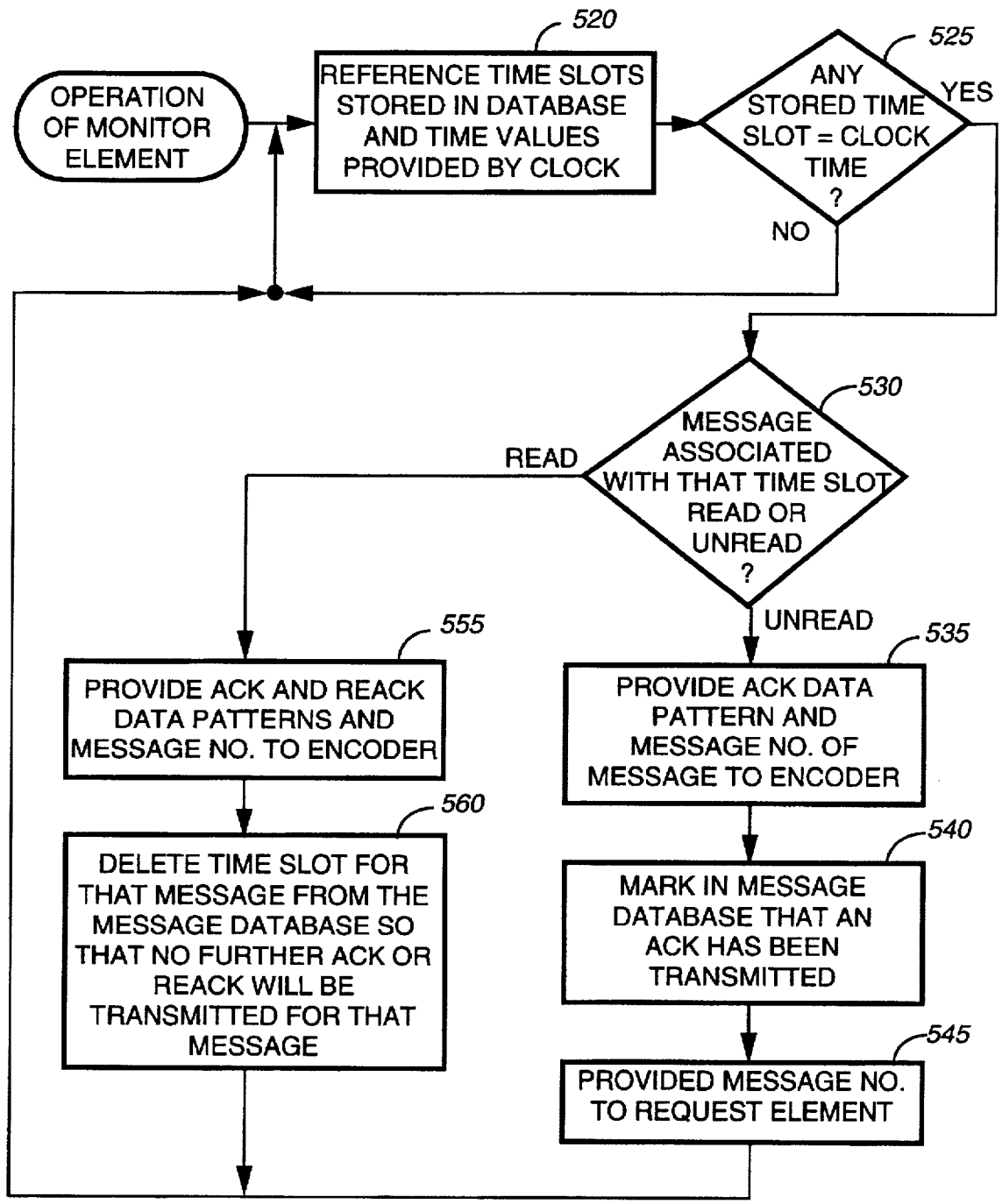
FIG. 12 is a flowchart showing an operation of a monitor element included in the transceiver of FIG. 10 in accordance with the present invention.

Referring next to FIG. 12, a flowchart depicts an operation of the monitor element 430 according to the present invention. At step 520, the monitor element 430 references time slots stored in the message database 415 and time values provided by the clock 395 (FIG. 10). When, at step 525, a stored time slot is equivalent to a clock time, the monitor element 430 determines, at step 530, whether the message associated with the time slot is read or unread. When the message has not yet been presented, the predetermined ACK pattern is provided, at step 535, to the encoder 375 along with the message number associated with the message. Thereafter, the monitor element 430 marks in the message database 415 that an ACK has been transmitted for the message, at step 540. At step 545, the monitor element 430 also provides the message number of the message to the request element 435 (FIG. 10).

When, at step 530, the message has been read, the monitor element 430, at step 555, provides only the REACK data pattern to the encoder 375 along with the message number. Thereafter, the monitor element 430 deletes, at step 560, the time slot for that message from the message database 415 so that no further ACK or REACK is transmitted for the message.

Figure 13:
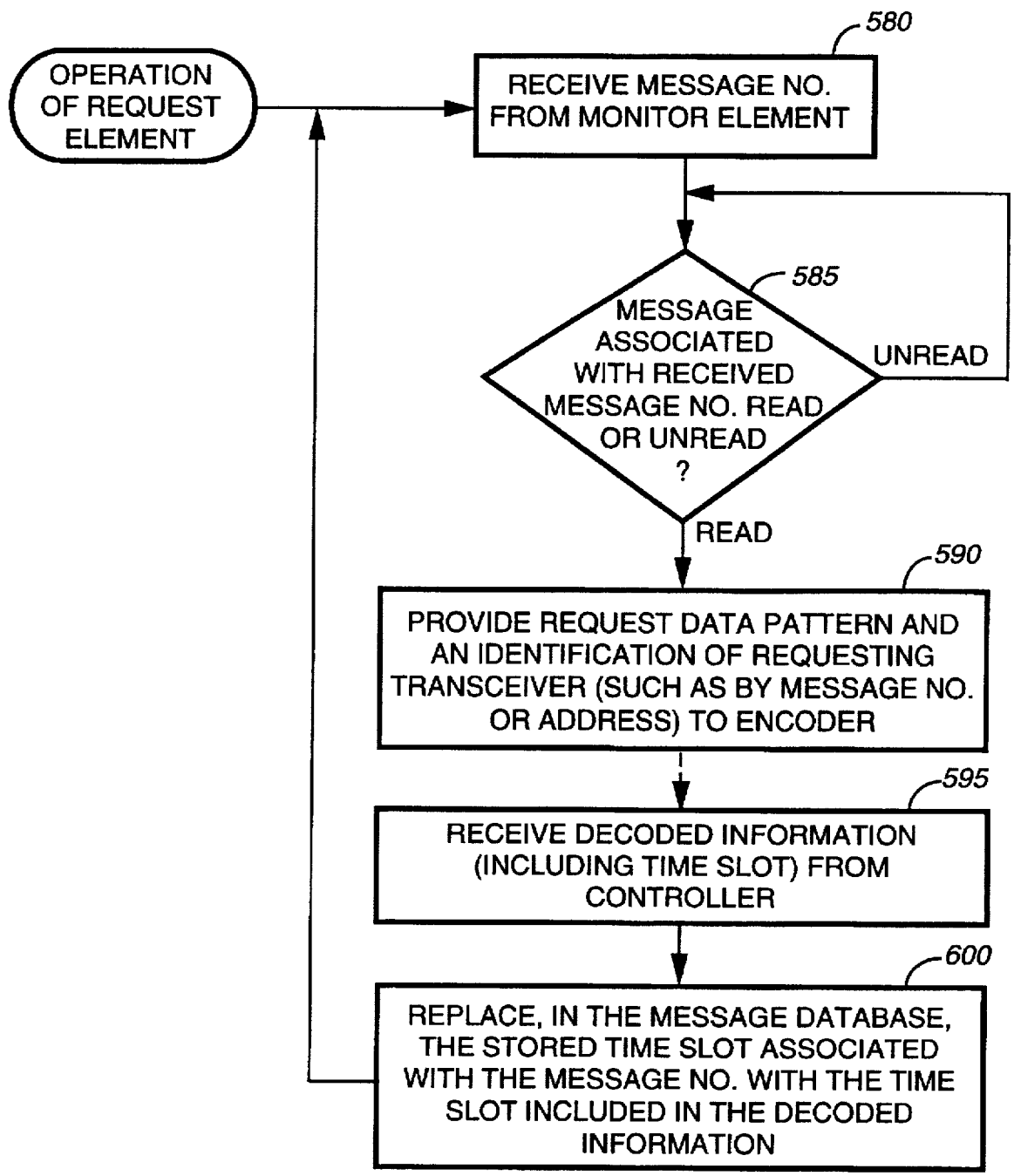
FIG. 13 is a flowchart depicting an operation of a request element included in the transceiver of FIG. 10 in accordance with the present invention.

FIG. 13 is a flowchart showing an operation of the request element 435. According to the present invention, the request element 435 receives, at step 580, a message number from the monitor element 430. When, at step 585, the message associated with the received message number has been read, the request element 430 provides, at step 590, the predetermined request data pattern and the message number to the encoder 375. Subsequently, the request element 435 receives, at step 595, decoded information from the controller 390 (FIG. 10). At step 600, the request element 435 preferably replaces the stored time slot associated with the message number with the time slot included in the received information. The monitor element 430 subsequently monitors the message database 415 to transmit any necessary signals, such as a REACK, during the replacement time slot.

Figure 1:
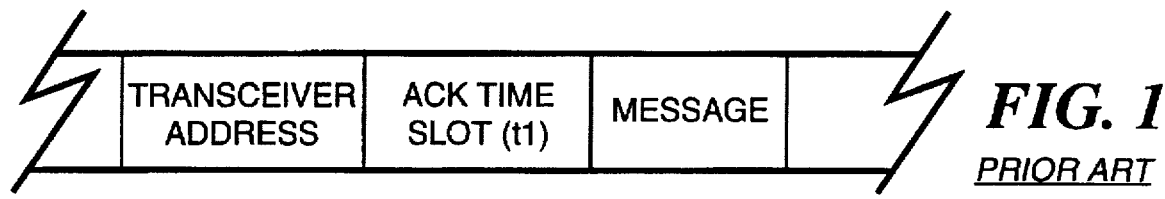
FIGS. 1–5 are signal diagrams depicting conventional transmissions between a message transmission device and a transceiver for providing acknowledgments to the message transmission device.
Figure 2:
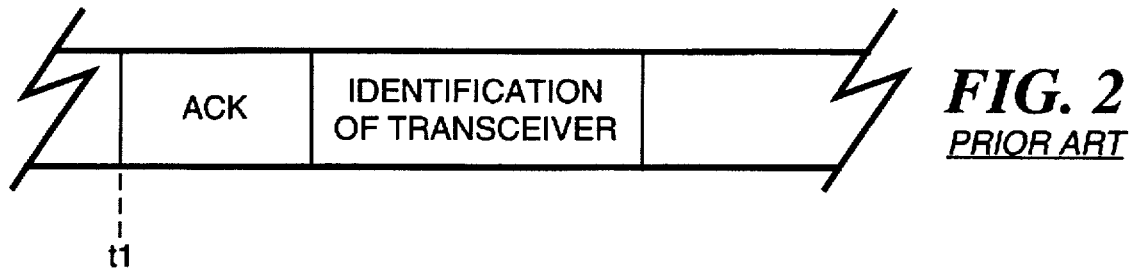
Figure 3:
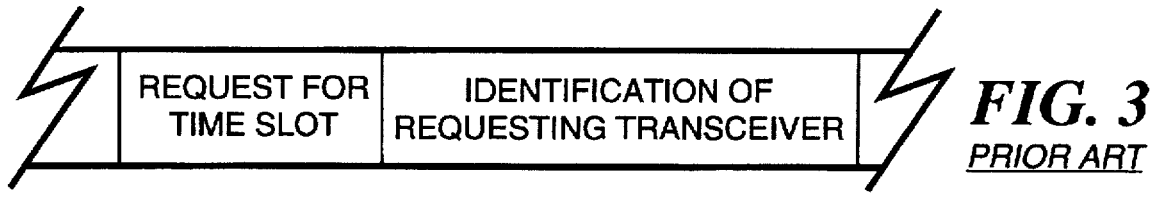
Figure 4:
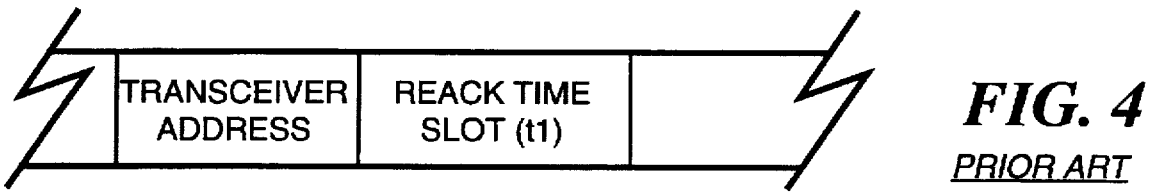
Figure 5:
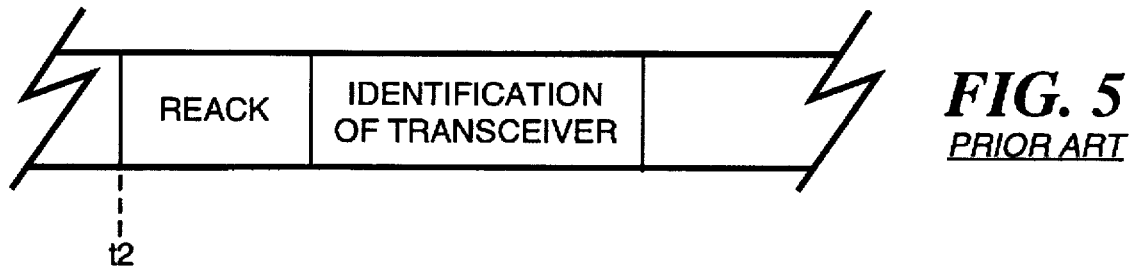
Figure 14:
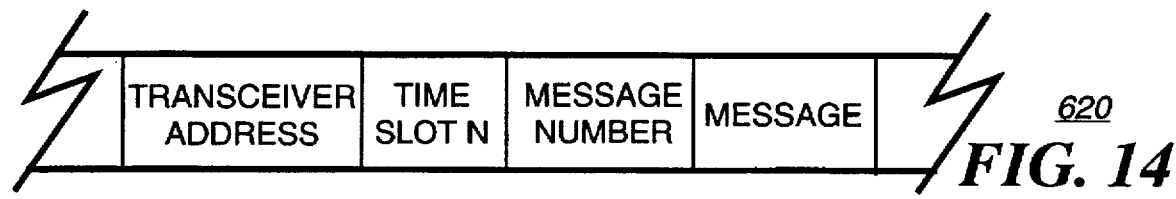
FIG. 14 is a signal diagram of a signal provided by the message transmission device to the transceiver in accordance with the present invention.
Figure 15:
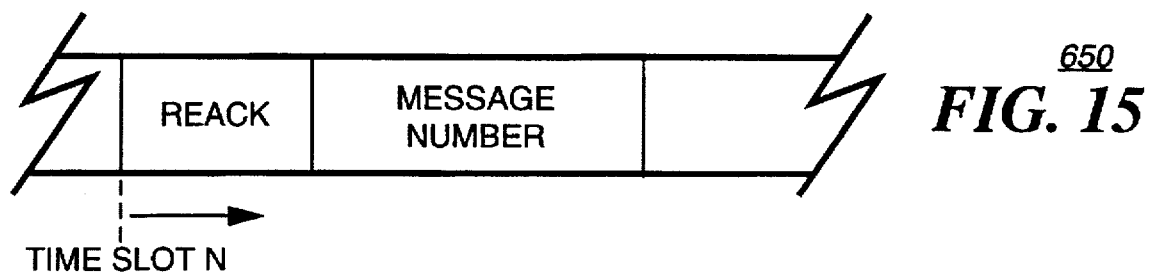
FIG. 15 is a signal diagram depicting a signal provided by the transceiver to the message transmission device in accordance with the present invention.

FIGS. 14 and 15 are signal diagrams depicting communications between the transceiver 125 and the terminal 105 in accordance with the present invention. As shown in FIG. 14, the terminal 105 initially transmits a radio signal 620 to the transceiver 125. The radio signal 620 preferably includes the address of the recipient transceiver 125, a time slot, e.g., time slot n, a message number, and a message. Thereafter, when the user of the transceiver 125 has already read the message, the transceiver 125 transmits a radio signal 650 during time slot n, as shown in FIG. 15. The radio signal 650 from the transceiver 125 advantageously includes both only a REACK, as opposed to an ACK, as well as means for identifying the particular message to which the REACK refers. The transceiver 125 therefore does not need to request a further time slot for the later transmission of a REACK. Also, the transmission of only a REACK necessarily indicates to the terminal 105 that the message has been received, so no transmission of an ACK is required at all.

It will be understood that the transmission of a REACK, as opposed to an ACK, saves time and battery life by indicating that the message has been presented as well as received. However, it is contemplated that, in alternate embodiments of the present invention, additional information can be transmitted along with the REACK as well. For example, when the message requires a response, e.g., a "yes"

or "no" response, on the part of the user, and the user has input a response by the time the first time slot occurs, then the response could also be indicated in the transmission from the transceiver 125 during the first time slot. This could be done, for instance, by appending an additional bit to the REACK data pattern or by storing and transmitting other predetermined data patterns that indicate predetermined responses as well as message presentation.

In summary, the communication system described above includes a terminal for providing a message and a time slot to a transceiver. The transceiver receives the message and time slot and, when the time indicated by the time slot arrives, determines whether the message has been presented to the user. According to the present invention, when the message has already been displayed, the transceiver sends only a read acknowledgment (REACK) during the time slot, instead of a message acknowledgment (ACK). In this manner, the transceiver can transmit only a single acknowledgment to indicate both that the message has been received and that the message has been presented. The transceiver therefore does not have to send a request for another time slot and wait for a response from the terminal. As a result, the time between transmission of a message and reception of a REACK is decreased. Furthermore, the transmission of a REACK is, in some circumstances, accomplished by the transmission of fewer signals within the communication system. Because the transmission of a REACK can serve two purposes, i.e., indicating message reception and presentation, battery life is saved and the channel is used more efficiently.

It will be appreciated by now that there has been provided a method and apparatus for more efficiently providing acknowledgments to a message transmission device, such as a paging terminal.

What is claimed is:

1. A method for providing acknowledgments in a transceiver for receiving a message and time information indicative of a first time slot, wherein the transceiver includes a presentation device for presenting the message, the method comprising the steps of:

determining, at occurrence of a first time slot, whether the message has been presented;

generating, at occurrence of the first time slot, a message acknowledgment indicating that the message has been received when the message has not been presented;

generating, at occurrence of the first time slot, a read acknowledgment indicating that the message has been presented when the message has been presented; and transmitting, when the message has been presented, the read acknowledgment, rather than the message acknowledgment, during the first time slot to indicate that the message has been both received and presented.

2. The method of claim 1, further comprising the step of:

presenting, prior to occurrence of the first time slot, the message on the presentation device.

3. The method of claim 1, further comprising the step of:

transmitting the message acknowledgment without the read acknowledgment when the message has not been presented on the presentation device at occurrence of the first time slot.

4. The method of claim 3, further comprising, subsequent to transmission of the message acknowledgment, the steps of:

generating a request for a second time slot;

transmitting the request; and receiving time information indicative of the second time slot.

5. The method of claim 4, further comprising the steps of:
presenting, subsequent to occurrence of the first time slot, the message on the presentation device;
generating, subsequent to receiving the time information indicative of the second time slot, the read acknowledgment in response to presentation of the message on the presentation device; and
transmitting the read acknowledgment during the second time slot.

6. A method for providing acknowledgments in a communication system comprising a message transmission device for transmitting messages and a transceiver for receiving and presenting the messages on a presentation device, the method comprising the steps of:
the message transmission device transmitting a radio signal including a message and time information indicative of a first time slot;
the transceiver receiving the message and the time information indicative of the first time slot;
the transceiver determining, at occurrence of the first time slot, whether the message has been presented;
the transceiver generating, at occurrence of the first time slot, a message acknowledgment indicating that the message has been received at occurrence of the first time slot when the message has not been presented;
the transceiver generating, at occurrence of the first time slot, a read acknowledgment, indicating that the message has been presented, when the message has been presented; and
the transceiver transmitting, when the message has been presented, the read acknowledgment, rather than the message acknowledgment, during the first time slot to indicate that the message has been both received and presented.

7. The method of claim 6, further comprising, in the transceiver, the steps of:
transmitting the message acknowledgment without the read acknowledgment when the message has not been presented at occurrence of the first time slot;
generating a request for a second time slot subsequent to transmission of the message acknowledgment; and
transmitting the request.

8. The method of claim 7, further comprising, in the message transmission device, the steps of:
receiving the request for the second time slot;
assigning the second time slot; and
transmitting time information indicative of the second time slot to the transceiver.

9. The method of claim 8, further comprising, in the transceiver, the steps of:
receiving the time information indicative of the second time slot;
presenting the message on the presentation device;
generating, in response to presentation of the message and subsequent to reception of the time information indicative of the second time slot, the read acknowledgment; and
transmitting the read acknowledgment during the second time slot.

10. A transceiver for receiving messages and transmitting acknowledgments, the transceiver comprising:
a receiver for receiving a message and time information indicative of a first time slot;
a presentation device coupled to the receiver for presenting the message;
a monitor element coupled to the presentation device for determining, at occurrence of the first time slot, whether the message has been presented; and
a transmitter coupled to the monitor element and the receiver for transmitting, in response to occurrence of the first time slot, a message acknowledgment when the message has not been presented and a read acknowledgment, rather than the message acknowledgment, when the message has been presented, wherein the message acknowledgment is indicative of message reception, and, when transmitted during the first time slot, the read acknowledgment is indicative of both message reception and presentation.

11. The transceiver of claim 10, further comprising a clock coupled to the monitor element for generating time values.

12. The transceiver of claim 10, further comprising a message database for storing the message, the first time slot, and a message status indicative of whether the message has been presented.

13. The transceiver of claim 12, further comprising a controller coupled to the message database and the presentation device for setting the message status in the message database.

14. The transceiver of claim 10, further comprising a memory coupled to the transmitter for storing a message acknowledgment data pattern utilized for generating the message acknowledgment and a read acknowledgment data pattern utilized for generating the read acknowledgment.

15. The transceiver of claim 10, further comprising a request element coupled to the monitor element and the transmitter for generating a request for a second time slot when the message acknowledgment is transmitted without transmission of the read acknowledgment, wherein the request is provided to the transmitter for transmission therefrom.

16. The transceiver of claim 15, further comprising a memory coupled to the request element for storing a request data pattern utilized in generating the request.

17. The transceiver of claim 15, further comprising receiving means for receiving time information indicative of the second time slot and generating means for generating and transmitting the read acknowledgment during the second time slot when the message has been presented at occurrence of the second time slot.

18. A communication system for providing acknowledgments, the communication system comprising:
a message transmission device for transmitting a message and time information indicative of a first time slot; and
a transceiver for receiving the message and the time information indicative of the first time slot and for presenting the message, the transceiver comprising:
a clock for generating time values;
a monitor element coupled to the clock for determining whether the message has been presented at occurrence of the first time slot; and
acknowledgment of message reception when the message has not been presented and an acknowledgment of message presentation, rather than the acknowledgment of message reception, when the message has been presented.

19. The communication system of claim 18, wherein the transceiver further comprises:

a request element for generating a request for a second time slot when the message has not been presented at occurrence of the first time slot, wherein the request is transmitted by the transmitter;

a receiver for receiving time information indicative of the second time slot; and means for generating and transmitting, during the second time slot, the acknowledgment of message presentation when the message has been presented at occurrence of the second time slot.

20. The communication system of claim 19, wherein the message transmission element comprises:

receiving means for receiving the request for the second time slot;

a processor coupled to the receiving means for assigning the second time slot; and transmitting means for transmitting the time information indicative of the second time slot to the transceiver.

* * * * *

UNITED STATES PATENT AND TRADEMARK OFFICE
CERTIFICATE OF CORRECTION

PATENT NO. : 5,678,191
DATED : October 14, 1997
INVENTOR(S) : Eaton, et al.

It is certified that error appears in the above-indentified patent and that said Letters Patent is hereby corrected as shown below:

Claim 18, Column 10, line 61, before acknowledgment, insert --a transmitter for transmitting, during the first time slot, an--.

Claim 18, Column 10, line 61, change "recepti0n" to --reception--.

Signed and Sealed this

Twenty-sixth Day of May, 1998

Attest:

BRUCE LEHMAN

*Attesting Officer*  *Commissioner of Patents and Trademarks*